United States Patent [19]
Ebert et al.

[11] Patent Number: 5,564,775
[45] Date of Patent: Oct. 15, 1996

[54] ADJUSTABLE HINGE POST SYSTEM FOR VEHICLE

[75] Inventors: Jorg Ebert, Cologne; Volker Gomon, Stuttgart; Dieter Bungarten, Neustadt, all of Germany

[73] Assignee: Vereinigte Aluminum - Werke Aktiengesellschaft, Germany

[21] Appl. No.: 323,030

[22] Filed: Oct. 14, 1994

[30] Foreign Application Priority Data

Oct. 15, 1993 [DE] Germany .......................... 43 35 163.8

[51] Int. Cl.⁶ ............................................... B62D 25/04
[52] U.S. Cl. ...................... 296/202; 296/146.11; 16/236; 16/248; 16/249; 49/381
[58] Field of Search .................................. 296/202, 205, 296/146.11; 16/235–237, 248–249; 49/381, 501, 502

[56] References Cited

U.S. PATENT DOCUMENTS

| | | | |
|---|---|---|---|
| 2,615,194 | 10/1952 | Kreinor | 16/237 X |
| 2,860,911 | 11/1958 | Cotter | 296/146.11 X |
| 3,558,184 | 1/1971 | Plegat | 296/146.11 |
| 4,881,296 | 11/1989 | Marinoni | 16/237 |
| 4,980,946 | 1/1991 | Verasani et al. | 16/249 X |
| 4,986,597 | 1/1991 | Clausen | 296/205 |
| 5,067,200 | 11/1991 | Stowell et al. | 16/237 |
| 5,080,188 | 1/1992 | Okuhara et al. | 296/205 X |
| 5,269,585 | 12/1993 | Klaggs et al. | 296/205 |
| 5,271,687 | 12/1993 | Holka et al. | 296/205 X |
| 5,375,296 | 12/1994 | Zaleskie | 16/237 |
| 5,385,383 | 1/1995 | Kreis et al. | 296/202 |

FOREIGN PATENT DOCUMENTS

| | | | |
|---|---|---|---|
| 0612604 | 5/1988 | Australia . | |
| 22166 | 1/1981 | European Pat. Off. | 16/237 |
| 0267152 | 5/1988 | European Pat. Off. . | |
| 466231 | 1/1992 | European Pat. Off. | 49/381 |
| 2622526 | 5/1989 | France | 296/146.11 |
| 1704268 | 8/1955 | Germany . | |
| 2553848 | 6/1977 | Germany . | |
| 3726292 | 2/1989 | Germany . | |
| 4014385 | 11/1991 | Germany . | |
| 4034599 | 2/1992 | Germany . | |
| 4304922 | 8/1994 | Germany | 296/146.11 |
| 856333 | 12/1960 | United Kingdom | 296/146.11 |
| 1334050 | 10/1973 | United Kingdom | 296/202 |
| 9211156 | 7/1992 | WIPO . | |

*Primary Examiner*—Dennis H. Pedder
*Attorney, Agent, or Firm*—Brumbaugh, Graves, Donohue & Raymond

[57] ABSTRACT

Disclosed is a hinge past system which enables an operator to simultaneously install and position a door at a desired location on the body of a motor vehicle. The hinge past system includes a hinge having a first section and a second section. The second section is rotatably connected to the first section. The second section further includes a key for securing the door to the vehicle and for adjusting the position of the door relative to the vehicle, along the longitudinal axis. The hinge post system further includes hinge post having a first chamber and a second chamber. The first chamber has an extension for securing the post to the vehicle. The second chamber includes an extension and other means for adjusting the position of the hinge relative to the second chamber along the vertical and lateral axes. The longitudinal, vertical and lateral axes are substantially perpendicular to one another.

14 Claims, 4 Drawing Sheets

ADJUSTABLE HINGE POST SYSTEM FOR VEHICLE

FIELD OF THE INVENTION

The invention relates to a hinge post system which enables an operator to simultaneously install and position a door at a desired location on the body of a motor vehicle. The hinge post system includes an adjustable hinge which can be adjusted to and secured, via the hinge post system, at a desired location along the respective longitudinal, vertical and lateral axes of the vehicle.

BACKGROUND OF THE INVENTION

In addition to insisting on fuel efficiency, today's auto consumers demand that the vehicles they purchase be of the highest quality. One sign of a vehicle's quality, as is evident from recent television advertisements, is the alignment of the vehicle's outer body panels. The goal to achieve exact alignment of body panels has remained elusive, however, and the automotive industry continues to seek suitable methods for attaching functional parts, such as doors and hatches, to car body frames.

One known technique, disclosed in German patent number 4,014,385, involves cutting out sections in the body where cross-sectional changes are required and then providing support by welding on a suitable light metal casting. This method allows the body panels to be fixed to the vehicle at a desired location, however, the panels will be rigidly fixed, with the result that later adjustments will be costly and time consuming.

The disclosed technique, while an advance over the prior art, does not solve many of the problems in the art. Specifically, using this technique, it is difficult to finely adjust the door position relative to the surrounding body panels. Such adjustments can only be made by the application of manual force by a mechanic. This technique, in addition to requiring great skill and physical strength, is not consistently effective. Furthermore, it can only be carried out when the door is open, thereby increasing the risk of damage to the door.

Another known technique, disclosed in German Patent 3,726,292, does not involve using manual force, but rather involves a complicated procedure wherein the door is temporarily dismantled, the door frame is installed, and then the door body is installed to the door frame. This installation technique requires numerous exacting measurements in the door post, the roof frame, and possibly other body parts. In addition, this technique stems from the false premise that, in principle, doors cannot be simultaneously installed and positioned on a vehicle.

SUMMARY OF THE INVENTION

The object of the present invention, then, is to develop an adjustable hinge post system including an adjustable hinge for connecting a door to the post. The system permits the simultaneous installation and positioning of the vehicle doors at desired locations along the X, Y and Z axes, or the longitudinal, lateral and vertical axes. The longitudinal, vertical and lateral axes are substantially perpendicular to one another.

The adjustable nature of the system enables the user to accurately position the door relative to adjacent body panels and insures exact cooperation of components such as door locks, without need for any interim installation or shop assembly of the door. Further, the unique shape of the hinge post serves to prevent a vehicle door from opening due to lateral forces which may occur during an accident.

The hinge post system includes a hinge having a first member and a second member. The second member, at one end thereof, is rotatable connected to the first member via a substantially vertical hinge pin. The other end of the second member includes a key for securing the door onto the frame of the vehicle and for adjusting the position of the door relative to the frame along the longitudinal axis.

The hinge post system further includes a hinge post of substantially L-shaped cross-section having a first leg portion and a second leg portion, the first leg portion being longer than the second leg portion. The first leg portion has an extension for connecting the post with the frame of the vehicle. The second leg portion also has an extension. The second leg portion is engaged with the first member of the hinge for adjusting the position of the hinge relative to the second leg portion along the vertical and lateral axes.

In particular, the leg portions are hollow and in the form of first and second chambers. When the first and second chambers are viewed in cross section along the vertical axis, it can be seen that the chambers are generally arranged in the shape of the letter L. The first chamber takes the form of the long leg of the L and the second chamber takes the form of the short leg of the L. Further, the four walls of the second chamber form an asymmetrical part.

The second chamber has an extension which includes a substantially vertical groove for adjusting the position of the hinge relative to the second chamber along the vertical axis. The second chamber further includes a serrated section for adjusting the position of the hinge relative to the second leg portion along the vertical axis, and a selected wall which is engaged with an interior section of the door to prevent the door from opening due to lateral forces during an accident. The serrated section is adjacent to the substantially vertical groove.

A first member of the hinge includes two or more holes which are vertically displaced from each other. The first member of the hinge further includes a serrated section and a vertical line for aligning the hinge along the vertical axis. The vertical line enables an operator to quickly position the hinge along the lateral axis. After the hinge has been positioned, the operator can make fine lateral adjustments to insure that the door is properly aligned.

The respective serrated sections have serrations which run substantially along the vertical axis. The serrated section on the first member of the hinge meshes with the serrated section on the second chamber of the post. The serrated sections engage one another in a manner akin to an adjusting rack.

The first member of the hinge is positioned along the vertical axis by moving the hinge along the substantially vertical groove until the desired position is obtained.

The second member of the hinge includes a key having a threaded hole. The key is inserted into a substantially horizontal groove in the door, thereby enabling one to position the door at a desired location along the longitudinal axis of the vehicle. Once the desired position along the longitudinal axis is obtained, the key is either wedged into the horizontal groove to hold the door in place, or a screw is inserted into the threaded hole to hold the door in place by forcing the key into engagement with a wall of the groove.

DETAILED DESCRIPTION OF THE INVENTION

The invention will be described in detail with reference to FIGS. 1–5.

The inventive hinge post system enables a door to be adjusted in 1) the X axis (the vehicle's longitudinal axis); 2) the Y axis (the vehicle's lateral axis); and 3) the Z axis (the vehicle's vertical axis). The door can be adjusted even when the door is closed, thereby eliminating the trial and error methodology required of prior art systems. Further, interim assembly of the door can generally be avoided, because the precise position of the door can be obtained with only minor adjustments during installation.

Figure 2:
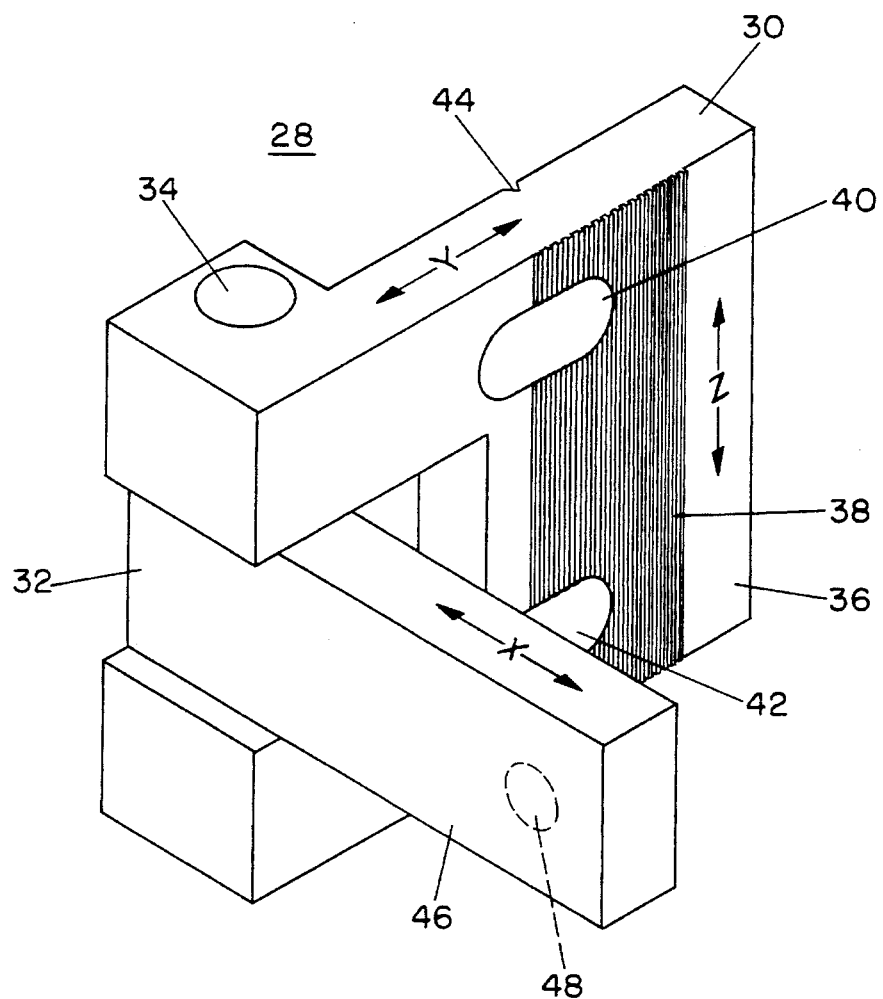
FIG. 2 shows a perspective view of the adjustable hinge according to the invention.
Figure 4:
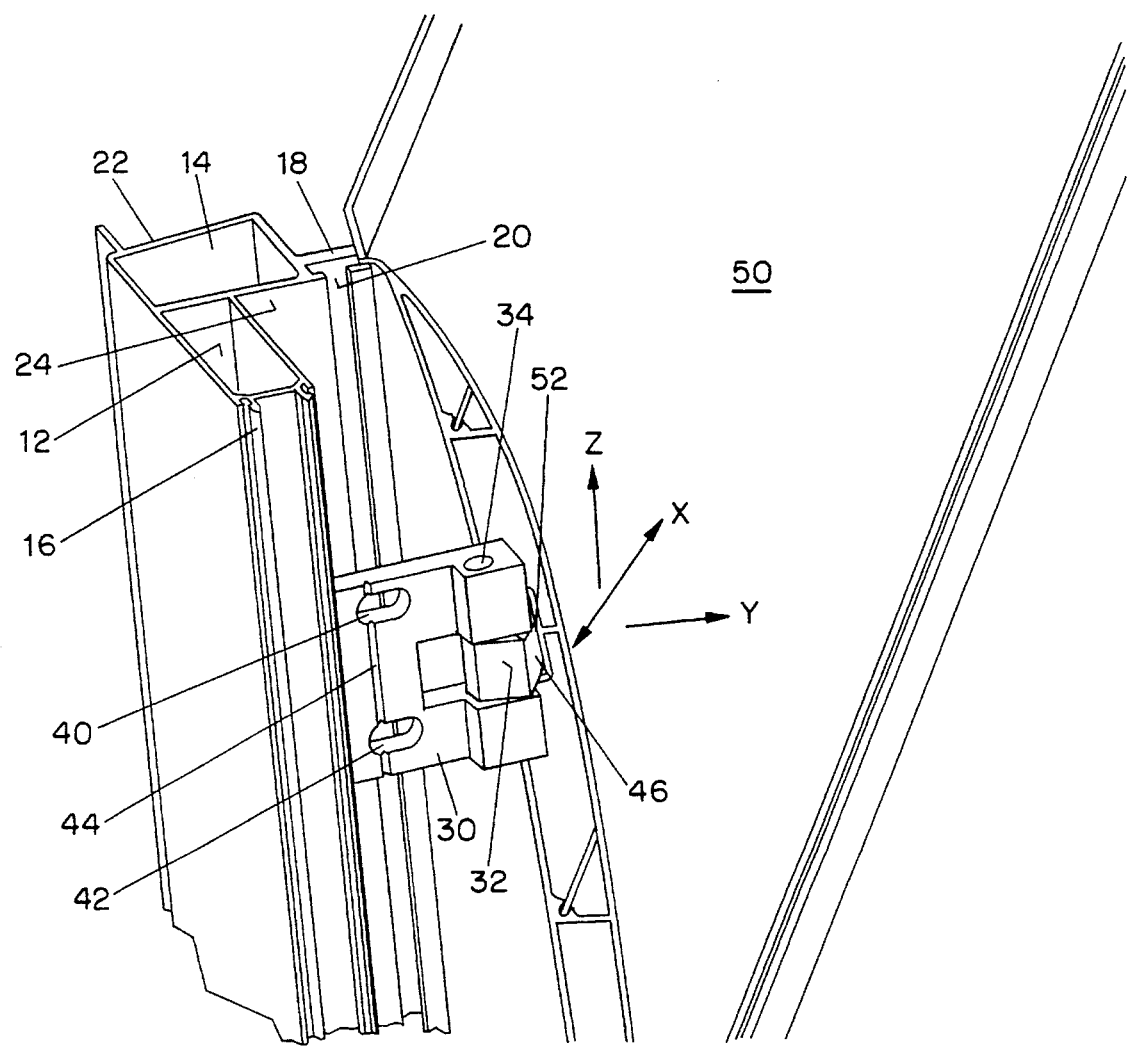
FIG. 4 shows a perspective view of the hinge post system including the adjustable hinge and a door.

As shown in FIGS. 2 and 4, the hinge post system includes a hinge 28 having a first member 30 and a second member 32. One end of the second member 32 is rotatably connected to the first member 30 via a substantially vertical hinge pin 34. The other end of the second member 32 includes a key 46 for securing the door 50 onto the frame of the vehicle and for adjusting the position of the door 50 relative to the frame along the longitudinal axis. The key 46 has a threaded hole 48 for a bolt that secures the door in place.

Figure 1:
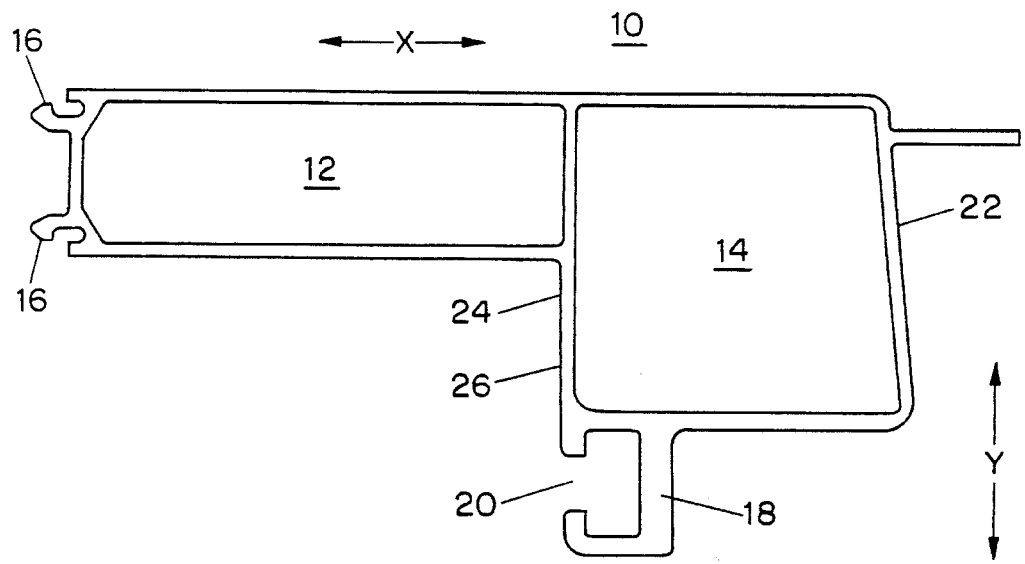
FIG. 1 shows a cross-section of the hinge post according to the invention.

Referring to FIG. 1, the hinge post system further includes a hinge post 10 of substantially L-shaped cross-section having a first leg portion 12 and a second leg portion 14. The first leg portion 12 has an extension 16 for connecting the post 10 with the frame of the vehicle. The second leg portion 14 also has an extension 18. The second leg portion 14 engages the first leg portion 30 of the hinge 28 for adjusting the position of the hinge 30 relative to the second leg portion 14 along the vertical and lateral axes.

When the first 12 and second 14 leg portions are viewed in cross section along the vertical axis, it can be seen that the chambers 12 and 14 are generally arranged in the shape of the letter L. The first portion 12 forms the long leg of the L and the second portion 14 forms the short leg of the L. Further, the four walls of the second leg portion 14 form an asymmetrical part.

Figure 5:
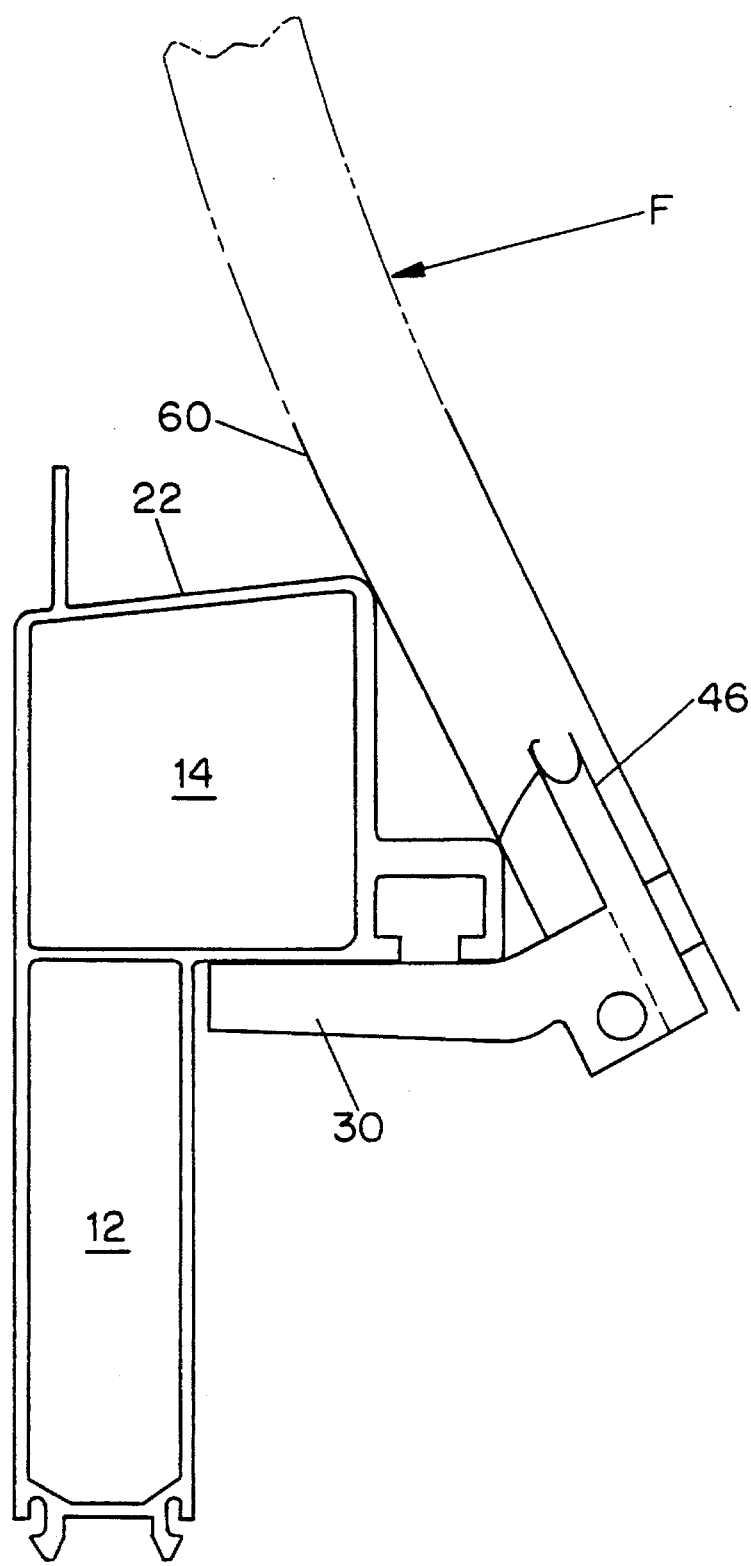
FIG. 5 shows the effect of a side impact on the door.

The second leg portion 14 has an extension 18 which includes a substantially vertical groove 20 for adjusting the position of the hinge 28 relative to the second leg portion 14 along the vertical axis. The second leg portion 14 further includes a serrated section 26 for adjusting the position of the hinge relative 28 to the second leg portion 14 along the vertical axis, and, as shown in FIG. 5, a selected wall 22 which engages an interior section 60 of the door 50 to prevent the door from opening due to lateral forces F during an accident. The serrated section 26 is located adjacent to the substantially vertical groove 20.

As shown in FIG. 2, the first member 30 of the hinge 28 includes two or more holes 40 and 42 which are vertically displaced from each other. The first section 30 of the hinge 28 further includes a serrated section 38 and a vertical line 44. The vertical line 44 enables an operator to quickly position the hinge 28 along the lateral axis. After the hinge 28 has been quickly positioned, the operator can continue to make fine lateral adjustments to insure the door 50 is properly aligned.

As shown in FIGS. 1 and 2, serrations of both serrated sections 38 and 26 run substantially along the vertical axis. The serrated section 38 an the hinge 28 meshes with the serrated section 26 on the post 10. The serrated sections 38 and 26 engage one another in a manner akin to an adjusting rack.

The first member 30 of the hinge 28 is positioned along the vertical axis by moving the hinge 28 along the substantially vertical groove 20 until the desired position is obtained.

Referring to FIG. 2, the second member 32 of the hinge 28 includes a key 46 having a threaded hole 48. The key 46 is inserted into a substantially horizontal groove 52 in the door 50, thereby enabling one to position the door 50 at a desired location along the longitudinal axis of the vehicle. Once the desired position along the longitudinal axis is obtained, the key 46 is either wedged into the substantially horizontal groove 52 to secure the door 50 in a desired location, or a screw 54 is inserted into the threaded hole 48 to secure the door 50 in a desired location.

Figure 3:
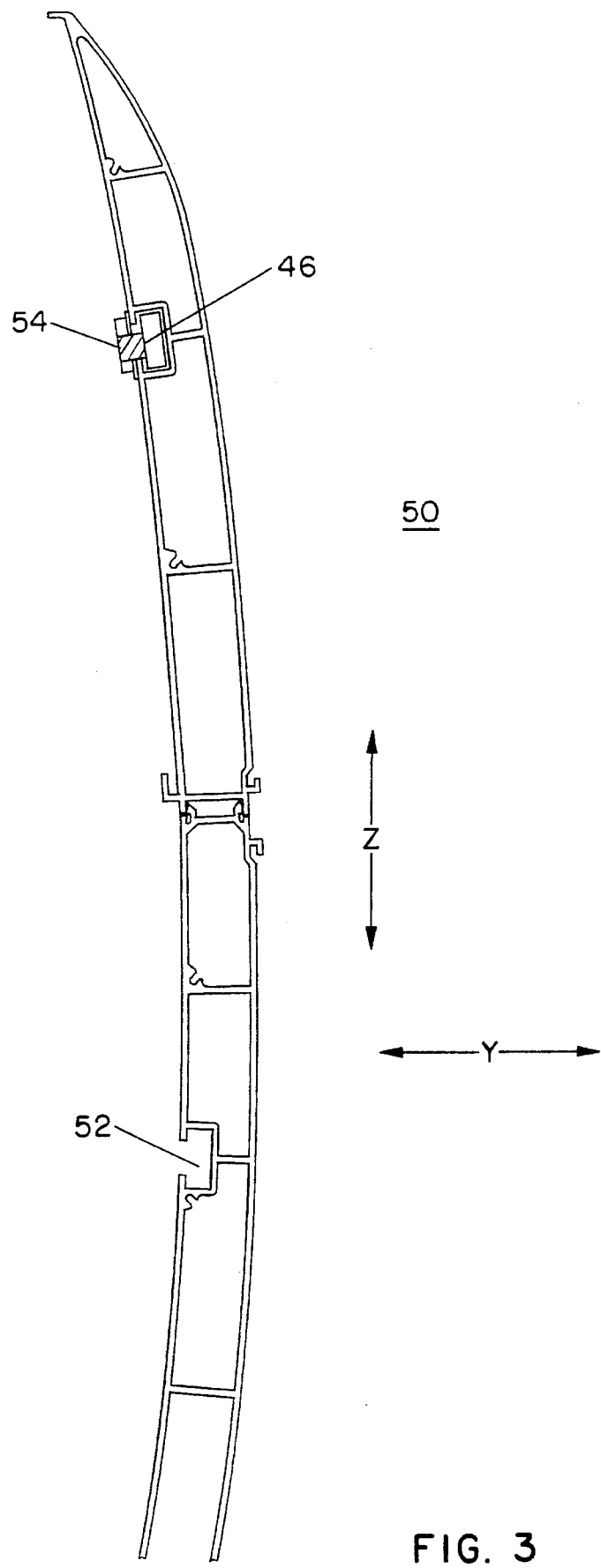
FIG. 3 shows a cross-section of an outer door shell composed of extruded sections.

FIG. 3 shows the outer wall of the vehicle door 50 which has several extruded sections joined together. The door 30 includes at least one C-shaped groove 52 which is substantially horizontal, running along the longitudinal axis of the vehicle. The key 46 is insertable into the substantially horizontal groove 52 and is fixably arranged within the groove 52. The door 50 can then be moved along the longitudinal axis to obtain an accurate positioning of the door 50 relative to the surrounding body panels. A clamp screw 54 or other means, insertable into the threaded hole, can be utilized to secure the door 50 in place. The key 46 can also be wedged into the substantially horizontal groove 52 to secure the door 50 in place.

FIG. 4 shows the hinge post system according to the present invention with the door 50 attached. The first leg portion 12 of the hinge post 10 includes a serrated section 16 which is utilized to secure the entire post 10 to the frame of the vehicle. The second leg portion 14 includes an extension 18 having a substantially vertical groove 20 which engages the adjustable hinge 28 for the purposes of positioning the hinge along the vertical axis.

The serrated surface 38 on the hinge 28, shown in FIG. 2, meshes with the serrated surface 26 on the second leg portion 14, shown in FIG. 1. The serrated surfaces 26, 38 act in the manner of an adjusting rack, and thereby enable the hinge 28 to be positioned at the desired location along the lateral axis.

Referring to FIG. 4, to facilitate alignment of the hinge 28 along the lateral axis, the first member 30 of the hinge 28 contains a vertical line 44 which is made in the vicinity of the holes 40 and 42. The vertical line 44 serves as an initial placement guide when selecting a desired location for the hinge 28 along the lateral axis.

The key section 46 of the adjustable hinge 28 enters the door groove 52. The groove 52 enables one to shift the door 50 relative to the key 46, thereby making the position of the door 50 adjustable along the longitudinal axis.

The holes 40 and 42 are utilized to position the hinge 28 at the desired location along the vertical axis. The hinge 28 can be positioned anywhere along the groove 20. Once the desired location is obtained, locking screws (not shown) are run through the oblong holes 40 and 42 to lock the hinge 28 in place.

In sum, the system enables one to quickly install and accurately position a vehicle door at desired locations along the longitudinal (X), lateral (Y) and vertical (Z) axes as follows:

1) An adjustment in the X axis or longitudinal axis of the vehicle is by way of engaging the key with the C-shaped door groove in the outer wall of the door;

2) An adjustment in the Y axis or the lateral axis of the vehicle is by way of engaging the serrated surface on the hinge post with the serrated surface on the adjustable hinge; and 3) An adjustment in the Z axis or vertical axis of the vehicle is by way of engaging the vertical C-shaped groove on the extension of the second leg portion of the hinge post with the oblong holes on the adjustable hinge post. Once the adjustable hinge is located at the desired location on the Z axis, a secure screw or clip is placed through the oblong holes to secure the adjustable hinge in place.

Moreover, the hinge post system enables an operator to quickly and efficiently mount a vehicle door to the frame of the vehicle. More importantly, the system enables the operator to accurately position the door at the desired location, and make any other desired adjustments, without causing extensive damage to the door. Further, in the event of a later accident or a change in the shape of adjacent body panels, the location of the door can be quickly adjusted to the new desired location.

We claim:

1. A hinge post system for securing a door to a frame for adjustment of the door relative to the frame along substantially mutually perpendicular longitudinal, vertical and lateral axes of the frame comprising a hinge having a first member and a second member and means for joining the first member to the second member for pivotal movement of the second member relative to the first member, and a hinge post of substantially L-shaped cross section having a first leg portion and a second leg portion, the second leg portion having a first surface defining at least a portion of a substantially vertical margin of an opening for the door and a second surface opposite from the first surface facing longitudinally away from the door opening and oriented substantially vertically and laterally, means for securing the first member of the hinge to the second surface of the second leg portion for adjustment of the door in the directions of the vertical and lateral axes, means for securing the door to second member of the hinge for adjustment of the door in the direction of the longitudinal axis, and means on an end of the first leg portion remote from the second leg portion of the hinge post for securing the hinge post to the frame.

2. A hinge post system according to claim 1 wherein the means for securing the first member of the hinge to the second surface of the second leg portion to the hinge post includes an extension of substantially C-shaped cross-section extending laterally from the second leg portion adjacent the second wall in a direction laterally away from the first leg portion, the extension having flange portions defining a vertical slot, and the flange portions having surfaces that are flush with the second surface of the hinge post.

3. A hinge post system according to claim 2 wherein the second surface of the hinge post has vertically extending first serrations, and the first member of the hinge has second serrations that mate with the first serrations in a selected laterally adjusted position of the first member of the hinge when the first member of the hinge is secured to the hinge post.

4. A hinge post system according to claim 2 wherein the first member of the hinge has two holes adapted to receive fasteners and spaced apart vertically, each hole being elongated laterally to enable adjustment of the first member of the hinge relative to the hinge post in the direction of the lateral axis.

5. A hinge post system according to claim 1 wherein the means for securing the door to second member of the hinge includes a substantially horizontal C-shaped groove in the door receiving the second member of the hinge, the door being slidable in the longitudinal direction to an adjusted position and means for securing the second member of the hinge to the door in the adjusted position.

6. A hinge post system according to claim 5 wherein the means for securing the second member of the hinge to the door in the adjusted position includes a threaded hole in the second member of the hinge and a clamping screw received in the threaded hole.

7. A hinge post system according to claim 1 wherein the hinge post is of substantially uniform transverse cross-section, and each leg portion has walls defining closed chambers.

8. A hinge post system according to claim 1 wherein the first surface of the hinge post has an edge that faces a interior wall portion of the door and is engageable by the interior wall portion of the door upon deformation of the door by a side impact so as to prevent the door from opening.

9. A hinge post system for securing a door to a frame for adjustment of the door relative to the frame along substantially mutually perpendicular longitudinal, vertical and lateral axes of the frame comprising a hinge having a first member and a second member and means for joining the first member to the second member for pivotal movement of the second member relative to the first member, and a hinge post of substantially L-shaped overall cross section, and of substantially uniform transverse cross-section, and having a first leg portion and a second leg portion, each leg portion having perimeter walls defining a cavity, the second leg portion having a first surface partly defining at least a portion of a substantially vertical margin of an opening for the door and a second surface opposite from the first surface facing longitudinally away from the door opening and oriented substantially vertically and laterally, means for securing the first member of the hinge to the second surface of the second leg portion for adjustment of the door in the directions of the vertical and lateral axes including an extension of substantially C-shaped cross-section extending laterally from the second leg portion adjacent the second wall in a direction laterally away from the first leg portion, the extension having flange portions defining a vertical slot, and the flange portions having surfaces that are flush with the second surface of the hinge post, means for securing the door to the second member of the hinge for adjustment of the door in the direction of the longitudinal axis, and means on an end of the first leg portion remote from the second leg portion of the hinge post for securing the hinge post to the frame.

10. A hinge post system according to claim 9 wherein the second surface of the hinge post has vertically extending first serrations, and the first member of the hinge has second serrations that mate with the first serrations in a selected laterally adjusted position of the first member of the hinge when the first member of the hinge is secured to the hinge post.

11. A hinge post system according to claim 10 wherein the first member of the hinge has two holes adapted to receive fasteners and spaced apart vertically, each hole being elongated laterally to enable adjustment of the first member of the hinge relative to the hinge post in the direction of the lateral axis.

12. A hinge post system according to claim 9 wherein the means for securing the door to second member of the hinge includes a substantially horizontal C-shaped groove in the door receiving the second member of the hinge, the door being slidable in the longitudinal direction to an adjusted position and means for securing the second member of the hinge to the door in the adjusted position.

13. A hinge post system according to claim 12 wherein the means for securing the second member of the hinge to the door in the adjusted position includes a threaded hole in the second member of the hinge and a clamping screw received in the threaded hole.

14. A hinge post system according to claim 9 wherein the first surface of the hinge post has an edge that faces an interior wall portion of the door and is engageable by the interior wall portion of the door upon deformation of the door by a side impact so as to prevent the door from opening.

* * * * *